United States Patent [19]

Nylund et al.

[11] 4,223,688
[45] Sep. 23, 1980

[54] BEAN SPROUT HARVESTER

[75] Inventors: Kenneth G. Nylund, Rte. 1, Box 40C, Globe, Ariz. 85501; Kai Y. Lee, Phoenix, Ariz.

[73] Assignee: Kenneth G. Nylund, Globe, Ariz.

[21] Appl. No.: 33,133

[22] Filed: Apr. 25, 1979

[51] Int. Cl.³ .......................... B08B 3/02; B08B 3/06
[52] U.S. Cl. ........................................ 134/60; 134/79; 134/104; 134/134; 99/567; 209/173
[58] Field of Search ................... 99/567; 209/173; 134/60-61, 78-79, 104, 133-134, 153

[56] References Cited

U.S. PATENT DOCUMENTS

| | | | |
|---|---|---|---|
| 2,119,170 | 5/1938 | Lott | 134/60 |
| 2,179,035 | 11/1939 | Ferry | 134/104 UX |
| 3,351,204 | 11/1967 | Anderson | 134/134 X |
| 3,802,448 | 4/1974 | Bell | 134/104 |
| 3,909,291 | 9/1975 | Leong | 134/104 X |
| 4,045,243 | 8/1977 | Wohlert | 134/60 X |
| 4,063,565 | 12/1977 | Edwards et al. | 134/134 X |

FOREIGN PATENT DOCUMENTS 838117  5/1952  Fed. Rep. of Germany ........... 134/104

Primary Examiner—Robert L. Bleutge
Attorney, Agent, or Firm—Cahill, Sutton & Thomas

[57] ABSTRACT

Apparatus for treating bean sprouts to remove hulls, cut-off roots from the sprouts, and to wash them. The apparatus comprises essentially an open-top tank having a chute at one end for receiving sprouts to be cleaned, and a plurality of jets adjacent to the chute which delivers water thereto to agitate the sprouts. A source of water under pressure includes spray nozzles for filling the tank and further agitation. A conduit extends to a low pressure screen drum. From the latter, another conduit extends to a pump. A discharge chute communicates with the screen drum. Between the screen drum and the feed chute is a cylindrical screen which rotates in unison with the screen drum. A motor-driven drive belt rotates the screen drum and the cylindrical screen in unison. The cylindrical screen enhances the agitation and partially removes foreign material from the cylindrical member. The screen drum also has a plurality of radially extending blades which not only further the agitation, but also pick up foreign matter. A jet manifold is mounted on the screen drum and cleans materials collected on the drum.

9 Claims, 5 Drawing Figures

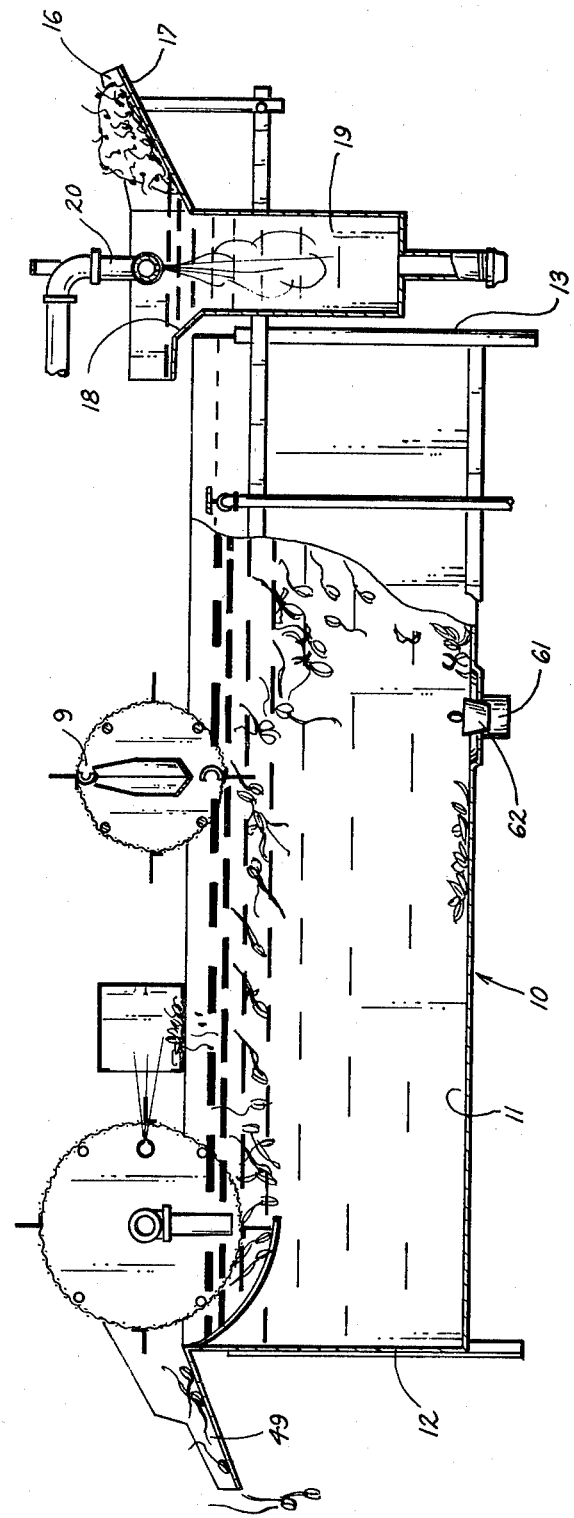
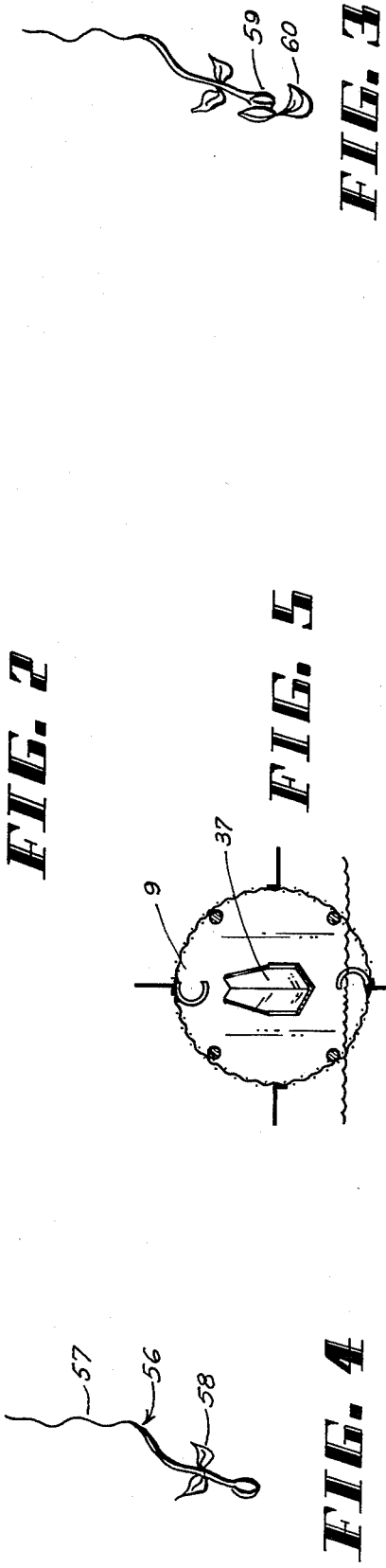

BEAN SPROUT HARVESTER

The present invention relates to the harvesting of bean sprouts and is concerned primarily with apparatus which operates on the flotation principle and includes a feed chute, a discharge chute, and a pair of cylindrical screens which skim material from the surface of the water in a flotation tank.

BACKGROUND OF THE INVENTION

For some time, bean sprouts have been widely used in Oriental food preparations and this use is now being enlarged and emphasized in other countries. Bean sprouts are ordinarily grown in a tank of water and are ready to be harvested in about four days. A typical bean sprout includes a bean pod which is encased in a hull and from which the sprout proper extends upwardly. This sprout ordinarily includes some small cut-off roots which must be removed from the sprout after washing the sprout. After cleansing the sprout, the hull must be removed from the bean pod prior to using the sprout.

The present invention is founded on the concept of providing an open-top tank into which water from a suitable source of supply under pressure is delivered. The bean sprouts rise to the surface of the water by flotation and the hulls fall to the bottom of the tank under gravity action. Unsprouted beans also float to the surface and, if not removed, the unsprouted beans rot and spoil the sprouted beans.

Before this application was prepared for filing in the Patent Section of the U.S. Patent and Trademark Office, a patentability search was conducted which brings to light the following patents which are the closest prior art of which the applicants are aware:

U.S. Pat. Nos. 3,998,728, Strauss; 4,063,565, Edwards et al.; 2,238,997, Gaymon; 2,945,589, Olney; 2,365,734, Tromp; 2,362,130, Glenn; 1,835,634, Chapman.

Briefly referring to the disclosures of certain of these patents, it is noted that Edwards et al. is believed to be the reference closest to the subject invention. While it refers to the cleaning of various vegetables, sweet potatoes are particularly mentioned. It operates on the flotation principle and the sweet potatoes are simply dumped in a pile at one end of the flotation tank. The mixture of potatoes and water is driven to an outlet by a paddle wheel. It is lacking in many of the features of the subject invention and particularly in the use of spray nozzles for cleaning the potatoes immediately after they are introduced into the tank, a pair of cylindrical screen members which move the cleaned potatoes to an outlet, and a jet manifold which removes foreign matter from the exterior surface of one of the cylindrical screen members.

Chapman is directed to means for separating good-quality peas from poor-quality ones, which operates under gravity action with the peas being immersed in a brine.

Glenn is another example of grading apparatus for fruits and vegetables by a flotation tank and gravity action.

Olney is still another example of a vegetable separating machine for removing light trash and materials like stones, cinders, broken glass, etc., from good vegetables in a flotation tank.

Gaymon is directed to means for separating dry or frozen fruits from juicy fruits. It is lacking in many of the features of the instant invention.

Strauss is to the separation of raw mineral materials and literally the only point it has in common with the subject invention is the use of a flotation tank.

OBJECTS OF THE INVENTION

With the foregoing conditions in mind, the present invention has in view the following objectives:

1. To provide bean sprout harvesting apparatus including an open-top tank, a feed chute at one end, a discharge chute at the other end, spray nozzles for introducing water under pressure from a supply to the tank, and a pair of cylindrical screens which agitate the mixture of water and sprouts;

2. To provide, in apparatus of the type noted, a jet nozzle assembly for introducing jets of water from the high pressure side of a pump to a chamber immediately adjacent the feed chute;

3. To provide, in apparatus of the character foresaid, a pair of cylindrical screen members which are motor driven to rotate in the same direction with one of said members having the discharge chute communicating therewith and which includes a mixture of water and the materials to be removed from the sprouts under low pressure and which is connected to the low pressure side of the pump aforesaid;

4. To provide, in apparatus of the kind described, a conduit which is connected to the water supply intermediate its ends and which has spray nozzles on one side of said connection and a conduit extending from the other side to the low-pressure cylindrical member;

5. To provide, in apparatus of the type noted, one of said cylindrical screen members between the feed and discharge chutes and which includes radially outstanding blades on the exterior thereof and an inner discharge conduit or trough for conveying waste material from the interior of this cylindrical member to disposal means, together with dippers on the inner surface of this cylindrical member which pick up foreign material which is passed through this cylindrical member and pass it to the trough;

6. To provide, in apparatus of the character aforesaid, a cylindrical screen member drum which communicates directly with the discharge chute and which has a manifold of jet nozzles connected to one side of the conduit which is connected to the water supply and which removes foreign matter which may collect on the exterior of this screen member and passes it to a receptacle which may be removed to dispose of the contents thereof;

7. To provide, in apparatus of the kind described, a pump which is driven by an electric motor for withdrawing water from the low-pressure cylindrical member and delivering it to the spray nozzles in the feed chute; and 8. To provide, in apparatus of the type noted, a drive belt and sheave assembly which is driven by an electric motor and which rotates the cylindrical members in the same direction.

SUMMARY OF THE INVENTION

The foregoing objects are achieved by providing an apparatus for treating bean sprouts which includes an open-top tank having parallel side walls and front and back end walls extending between said side walls at corresponding ends. A feed chute is mounted on the front end wall and a discharge chute is mounted on the back end wall. The feed chute includes a mixing chamber into which water is introduced from water jets positioned above the mixing chamber with the jets receiving water under pressure from the high pressure side of a pump.

A water supply line extends from an appropriate source of water under pressure, and a pair of opposed extensions are connected to said supply line. Spray nozzles for delivering water to the tank are mounted on one side wall of the tank and receive water under pressure from one of the opposed extensions. From the other extension a conduit extends to a jet nozzle manifold.

A first cylindrical screen member is rotatably mounted adjacent to the discharge chute. A conduit withdraws water from the interior of the first cylindrical member and delivers it to the low pressure side of the pump. A plurality of blades extends radially from the first cylindrical screen member and functions much in the manner of a skimmer to remove foreign matter from the surface of the water and also enters into the agitation of the mixture of water and foreign material. The jet nozzle manifold is located within the first cylindrical screen member and directs jets of water outwardly. Immediately adjacent to this jet nozzle manifold is a receptacle which receives the foreign matter which is literally blown from the surface of the first cylindrical screen. This receptacle may be removed so that it may be emptied from time to time.

A second cylindrical screen member also has a plurality of radially extending blades which enhances agitation of the mixture, an inner discharge conduit or trough which extends from the interior of the second cylindrical member to a disposal site, and a pair of dippers mounted on the inner surface of the second cylindrical screen member for conveying material within the interior of the second cylindrical screen member to the trough.

The two cylindrical members are rotated in the same direction and are driven by a drive belt which passes over a pair of sheaves and which is in turn driven from an electric motor.

An overflow drain is mounted on the side wall opposite to that on which the spray nozzles are mounted. It maintains the water in the tank at a desired level and includes an on/off valve and means for adjusting the height of the drain.

For a full and more complete understanding of the invention, reference may be had to the following description of the drawings, wherein:

FIG. 2 is a longitudinal vertical section taken through the apparatus from end to end;

FIG. 3 is a perspective illustrating a typical bean sprout complete before separation of the hull from the pod;

FIG. 4 is a perspective similar to FIG. 3 depicting the bean sprout after separation of the hull from the pod thereof; and FIG. 5 is a cross-section of the intermediate cylindrical screen taken on an enlarged scale and depicting the relation of the dippers to the discharge trough.

DESCRIPTION OF A PREFERRED EMBODIMENT

Figure 1:
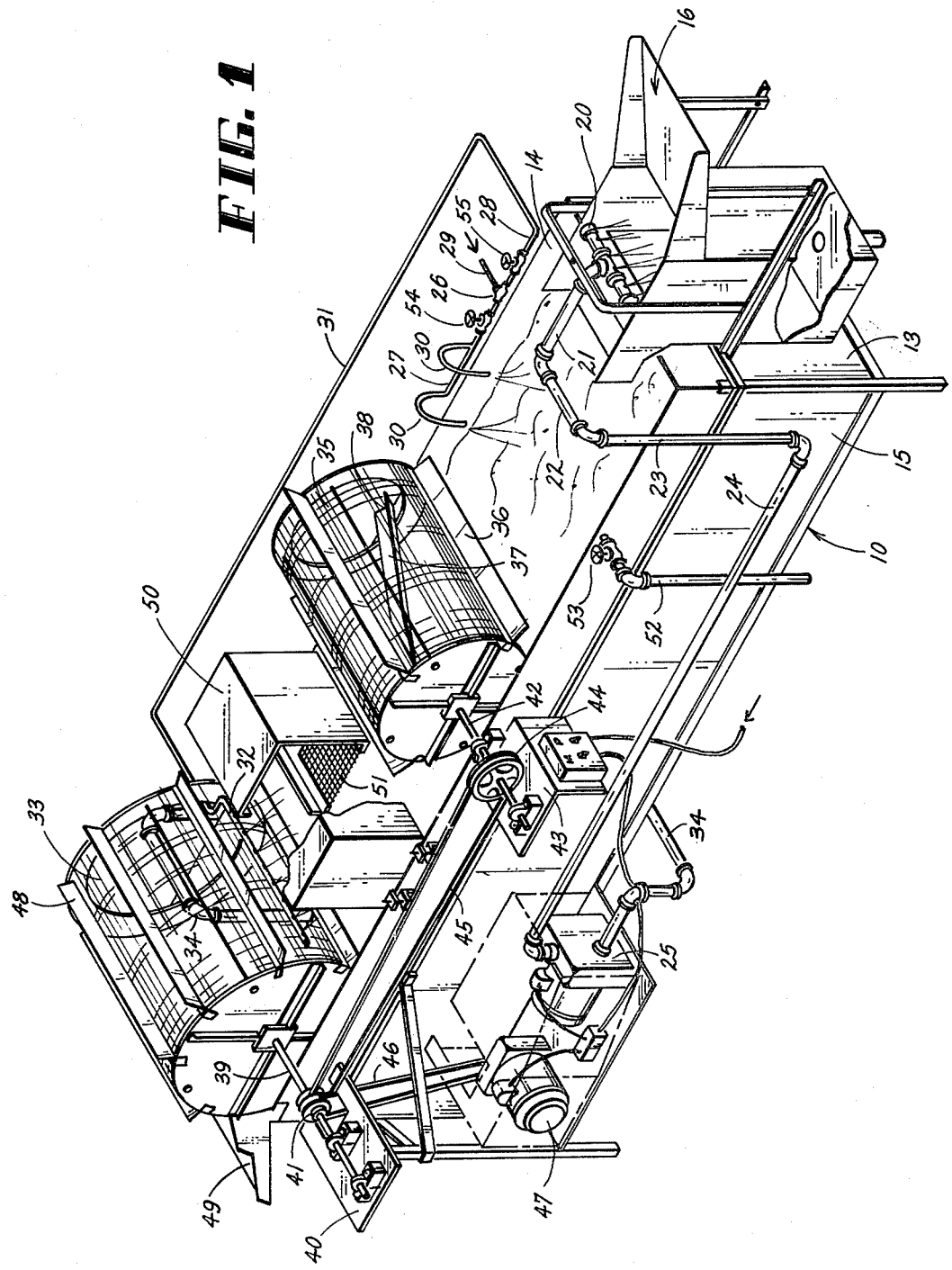
FIG. 1 is an isometric view illustrating the essential elements of the subject apparatus and the interrelation of such elements to provide the desired cleansing function.

Referring now to the drawings wherein like reference characters denote corresponding parts, and first more particularly to FIGS. 1 and 2, a flotation tank is identified in its entirety by the reference character 10. Tank 10 comprises a bottom wall 11, a back end wall 12, a second end wall 13, which for the purposes of this specification will be designated a front end wall, and side walls 14 and 15.

Mounted on the front end wall 13 is a feed chute designated generally 16. Feed chute 16 consists of a long inclined wall 17, a short inclined wall 18 and an open-top receptacle 19. This receptacle 19 is essentially rectangular in horizontal cross-section and the upper end of short inclined wall 18 overlies the flotation tank 10. Positioned over the open top of receptacle 19 is a plurality of jet nozzles 20 which are located between side walls 14 and 15 and are generally parallel to front end wall 13.

Communicating with the jet nozzles 20 is a conduit 21 which overlies the open top of tank 10 and is connected by additional conduits 22, 23 and 24 to the high-pressure side of a pump 25. Thus, the jet nozzles 20 eject a downwardly directed spray of water into the receptacle 19 which mixes with bean sprouts coming from the long inclined side 17 of the feed chute 16.

Mounted on side wall 14 of tank 10 is a T connection 26 presenting arms 27 and 28 and a stem 29. A source of water under pressure is fed into stem 29 and part of this water is delivered to spray nozzles 30 which are generally of inverted U shape and the outlets of which deliver water under pressure to the tank 10. From arm 28 a conduit 31 extends to a jet manifold 32. Rotatably mounted between side walls 14 and 15 adjacent back end wall 12 is a tubular cylindrical screen 33. This screen includes an intake tube 34 which goes to the low-pressure side of pump 25.

Mounted between side walls 14 and 15 is a so-called intermediate tubular cylindrical screen 35. This screen 35 carries a plurality of angularly spaced blades 36 which agitate the mixture of water and any foreign matter, including parts of the bean sprouts, and also moves this mixture of water and foreign matter towards back end wall 12.

The interior of screen 35 is provided with a disposal trough 37 having an end 38 which extends beyond the end of screen 35 slightly above side wall 14. Mounted on the inner surface of screen 35 are a pair of dippers 9 which rotate in a clockwise direction (speaking with reference to the showing of the drawings) and which pick up material on the interior of screen 35 and dump it into trough 37.

Screen 35 will be rotated in a manner to be hereinafter described and this rotation causes the dippers 9 to pick up foreign matter which is passed through the mesh of screen 35 and deliver it to a trough which conveys it to a suitable disposal site.

Screen 33 is mounted on an axle 39 which extends beyond side wall 15, being supported on a platform 40. Axle 39 includes an assembly 41 of two sheaves. Screen 35 is mounted on a drive shaft 42 which is journaled in bearings upstanding from a table 43. Another sheave 44 is drivably mounted on shaft 42. A drive belt 45 passes over sheave 44 and one of the sheaves in the assembly 41. A second drive belt 46 passes over the other sheave of the assembly 41 and over the driven shaft of an electric motor 47. Thus, with motor 47 in operation, the screens 33 and 35 are rotated in the same direction.

Outstanding from tubular screen 33 are a plurality of angularly spaced blades 48.

A discharge chute 49 is mounted on the upper edge of back end wall 12 and receives the elements of the bean sprouts which have been cleansed and which constitute the final product.

Mounted between tubular screens 33 and 35 is a waste receptacle 50 which receives water from jet manifold 32, together with any foreign matter which may have collected on the exterior of screen 33. This mixture is delivered into the waste receptacle 50 which is removed from time to time as it is filled and unloaded at a suitable disposal site.

Mounted on side wall 15 adjacent to its upper edge is an overflow drain 52 which includes a valve 53. The drain 52 maintains the level in tank 10 at a desired height and the rate at which water is drained therefrom is determined by adjusting valve 53.

The arms 27 and 28 of the T 26 also include an adjustable valve 54 to control the rate at which water is delivered to tank 10 and another valve 55 which controls the pressure at which water is delivered to jet manifold 32.

Referring now more particularly to FIGS. 3 and 4, a bean sprout which is typical of those which are delivered to feed chute 16 is designated generally 56. It includes a stem or bean sprout proper 57 from which leaves 58 extend outwardly. A bean pod 59 is depicted in FIG. 3 and contains seeds which are normally encased within a hull 60.

Operation

In operation, bean sprouts 56 are delivered to the feed chute 16 and pass downwardly into receptacle 19. At the same time, they are subjected to jets of water from the jet nozzle assembly 20. Tubular screen members 33 and 35 impel the mixture of water and any parts of the bean sprouts 56 which may be present on the surface of the water in tank 10 to discharge chute 49. Some of this foreign matter may pass through the mesh of the screen 35 and due to the rotation of the latter are picked up by the dippers 9 and passed to a suitable disposal site on the exterior of side wall 14 by way of trough 37. At the same time, the blades 36 on screen 35 move the mixture towards the discharge chute 49. The sheave and drive belt assembly cause the screens 33 and 35 to rotate in the same direction to achieve this movement of the mixture and also to agitate it to enhance the separation of the elements of the sprout. During this rotation, the blades 36 press the material on the surface of the water downwardly and some of it passes through the screen 35 to the interior thereof where it is picked up by the dippers 9.

The screen 33 is the low-pressure side of the system and water is drawn therefrom through conduit 34 to the low-pressure side of pump 25. Thus, water withdrawn from the interior of screen 33 is passed under high pressure to the jet assembly 20. Pump 25 is also driven by an electric motor.

The water in tank 10 is supplied by the spray nozzles 30 and maintained at a desired level by the drain 52.

The agitation of the bean sprouts 56 separates the hulls 60 from the pods 59. The separated hulls 60 drop onto the bottom wall 11 and after they have reached a desired depth may be removed in any manner desired, such as through the opening 61 which is normally closed by a plug 62.

While a preferred specific embodiment of the invention is hereinbefore set forth, it is to be clearly understood that the invention is not to be limited to the exact construction, materials and steps illustrated and described because various modifications of these details may be provided in putting the invention into practice.

What is claimed is:

1. A bean sprout harvester for washing bean sprouts and for separating hulls and unsprouted seeds from the bean sprouts, said bean sprout harvester comprising in combination:
   a. an open-top tank including first and second side walls, front and back end walls, and a bottom wall for containing a cleaning fluid;
   b. a feed chute mounted adjacent said front end wall for receiving the bean sprouts to be washed;
   c. a discharge chute mounted adjacent said back end wall for discharging the washed bean sprouts;
   d. a plurality of jet nozzles positioned adjacent said feed chute for directing cleaning fluid under pressure at the bean sprouts received by said feed chute;
   e. a first tubular screen member rotatably mounted between said first and second side walls adjacent said back end wall and having a plurality of blades on its outer surface for transferring washed bean sprouts into said discharge chute;
   f. a second tubular screen member rotatably mounted between said first and second side walls intermediate said front and back end walls and having a plurality of blades on its outer surface, said plurality of blades pressing bean sprouts and foreign matter below the surface of the cleaning fluid and moving the bean sprouts toward said back end wall, said second tubular screen member having a mesh which allows foreign matter to pass through said second tubular screen member and into the interior thereof, said second tubular screen member including conveying means attached to its interior surface for conveying foreign matter within the interior of said second tubular screen member;
   g. disposal means positioned within the interior of said second tubular screen member above the surface of the cleaning fluid for receiving the foreign matter conveyed by said conveying means and for removing the received foreign matter to a disposal site; and
   h. drive means coupled to said first and second tubular screen members for rotating said first and second tubular screen members in a direction for moving the bean sprouts toward said back end wall and into said discharge chute.

2. A bean sprout harvester as recited in claim 1 further including:
   a. a pump having a low-pressure or inlet side and a high-pressure or outlet side;
   b. a first conduit for coupling the outlet side of said pump to said plurality of jet nozzles for supplying cleaning fluid under pressure to said plurality of jet nozzles; and
   c. a second conduit for coupling the inlet side of said pump to the interior of said first tubular screen member for withdrawing cleaning fluid from the interior of said first tubular screen member;
   whereby, the introduction of cleaning fluid adjacent said front end wall and the withdrawal of cleaning fluid adjacent said back end wall aids movement of the bean sprouts from said front end wall to said back end wall.

3. A bean sprout harvester as recited in claim 2 further including:

a. at least one spray nozzle mounted on said first side wall for adding cleaning fluid to said open-top tank; and b. a drain mounted on the second side wall for draining cleaning fluid from said open-top tank.

4. A bean sprout harvester as recited in claim 2 wherein said feed chute includes an open-top receptacle, said plurality of jet nozzles being mounted directly above said open-top receptacle for directing cleaning fluid under pressure at the bean sprouts contained by said open-top receptacle, said open-top receptacle including an upper end which overlies said front end wall of said open-top tank for allowing bean sprouts and cleaning fluid to flow from said open-top receptacle to said open-top tank.

5. A bean sprout harvester as recited in claim 2 wherein said drive means comprises:

a. an electric motor;

b. a plurality of sheaves coupled to said first and second tubular screen members; and c. a drive belt assembly coupling said electric motor to said plurality of sheaves.

6. A bean sprout harvester as recited in claim 2 wherein said conveying means comprises at least one dipper attached to the inner surface of said second tubular screen member, said dipper lifting foreign matter within the interior of said second tubular screen member above the surface of said cleaning fluid and depositing the lifted foreign matter into said disposal means upon rotation of said second tubular screen member.

7. A bean sprout harvester as recited in claim 2 wherein said disposal means comprises a trough extending from the interior of said second tubular screen member beyond one of said side walls of said open-top tank.

8. A bean sprout harvester as recited in claim 2 wherein said first tubular screen member has a mesh which allows cleaning fluid to pass therethrough but which blocks the passage of foreign matter therethrough for preventing foreign matter from being circulated by said pump through said plurality of jet nozzles.

9. A bean sprout harvester as recited in claim 8 further including:

a. a jet manifold mounted within the interior of said first tubular screen member for directing a spray of cleaning fluid outwardly against said first tubular screen member to rinse foreign matter from the outer surface of said first tubular screen member; and b. a removable waste receptacle positioned above the open-top tank adjacent said first tubular screen member for receiving the spray of cleaning fluid from said jet manifold and the foreign matter rinsed thereby, said waste receptacle retaining the rinsed foreign matter until said waste receptacle is removed and cleaned of said foreign matter.

* * * * *